United States Patent Office 2,934,521
Patented Apr. 26, 1960

2,934,521

EPOXIDE RESIN COMPOSITIONS

John E. Masters, Darrell D. Hicks, and William J. Belanger, Louisville, Ky., assignors to Devoe & Raynolds Company, a corporation of New York No Drawing. Application June 11, 1956
Serial No. 590,417

12 Claims. (Cl. 260—47)

This invention relates to novel resinous compositions. In one of its aspects the invention relates to resin compositions which are derived from epoxide compounds, or polyepoxides. In another of its aspects the invention pertains to methods for the preparation of these novel resins.

A great deal of research has been directed toward the production of epoxide resins since these substances have been found to be valuable compositions for use in the manufacture of varnishes, molding resins, adhesives, films and the like.

It is known that these epoxide resins, obtained as a product of reaction of a dihydric compound, such as a dihydric phenol, and an epihalohydrin, can be converted to thermosetting resins by the use of polybasic carboxylic acid anhydrides. It is known, for example, that hard thermosetting resins are obtained by condensing certain epoxide resins with phthalic acid anhydride. This invention has as an object the provision of modified anhydride cured epoxide resins. The invention also relates to the production of a fusible, soluble composition, resulting from the modification of the anhydride-epoxide reaction mixture, the modified reaction mixture being capable on heating of forming an insoluble, infusible cured resin.

Theoretically one mol of a diepoxide should be cured with two mols of anhydride in order to obtain the maximum degree of cross-linking. However, a maximum degree of cross-linking yields a resin whose utility is limited by its brittleness. On the other hand, a ratio of less than two mols of anhydride to one mol of a diepoxide does not result in the greatest degree of cure. This invention is based on the discovery that, using glycidyl polyethers of dihydric phenols, when the reaction mixture of anhydride and epoxide is modified by the addition of a third ingredient a high degree of cure is obtained, yet a resin results which does not have the high degree of brittleness. Resins made according to the invention are well cured and hard and, because of their flexibility, lend themselves to a wide variety of applications, particularly in the adhesive, molding, casting and laminating fields. Moreover, there is a definite economic advantage in preparing resins according to this invention. Since modifiers of this invention replace part of the more expensive polyepoxide, the cured resin can be produced much more cheaply than the same quantity of unmodified cured resin.

In accordance with an embodiment of this invention the modified resins contemplated are prepared by the use as molifying agents of polyhydric phenols. The polyhydric phenols employed contain two or more phenolic hydroxyl groups linked to separate nuclear aromatic carbon atoms. Among suitable compounds of this class are mononuclear phenols, for example, resorcinol, catechol, phloroglucinol, orcinol, xylorcinol, apionol, etc., as well as polynuclear phenols such as bis-(4-hydroxyphenyl)-2,2-propane (bisphenol), 4,4'-dihydroxybenzophenone, bis-(4-hydroxyphenyl)-1,1-ethane, bis-(4-hydroxyphenyl)-1,1-isobutane, bis-(4-hydroxyphenyl)-2,2-butane, bis-(4-hydroxy-2-methyl phenyl)-2,2-propane, bis-(4-hydroxy-2-tert butyl phenyl)-2,2-propane, bis-(2-hydroxynaphthyl)-methane, 1,3-dihydroxynaphthalene, 1,2,5,6-tetrahydroxynaphthalene, etc. The polyhydric phenols well-suited for use in the invention are of the formula $R(OH)_n$ wherein "$n$" is an integer of 2 to 4, each hydroxyl group being linked directly to a different nuclear carbon atom of R which is an aromatic hydrocarbon radical.

Particularly important are diphenols. By diphenol is meant (a) a polynuclear phenol having two phenolic hydroxyl groups as its sole reactive groups such as dihydroxydiphenylmethanes, their isomers, their homologs, and their substituted compounds and (b) a benzene ring having two hydroxyls such as resorcinol and the like. Included in addition to resorcinol, are other dihydric phenols, for example, hydroquinone and catechol. Also important are compounds containing two benezene nuclei linked to each other directly or through other atoms or atom groups, for example, $—(CH_2)_n—$, $—SO_2—$, $—O—$, $—CO—$, and $—CR_2—$, and having two phenolic hydroxyl groups as their sole reactive groups. Especially preferred are compounds represented by the general formula

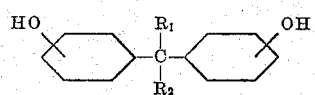

wherein $R_1$ and $R_2$ are alkyl, cyclohexyl, or phenyl groups. Examples of such compounds are 4,4'-diphenols made by the condensation of phenols with aldehydes, and dihydroxydiphenylmethane, dihydroxydiphenylmethylmethane, dihydroxydiphenyldimethylmethane, dihydroxydiphenylethylmethane, dihydroxydiphenyldiethylmethane, dihydroxydiphenylmethylpropylmethane, and dihydroxydiphenylethylphenylmethane. Other diphenols within the scope of this invention are bisphenol and phenol-epoxide condensates, for example, the product of 2 mols of bisphenol with one mol of epichlorhydrin or glycerol dichlorhydrin.

Thus in one of its aspects this invention provides for the preparation of cured resins by the reaction of a polybasic acid anhydride, a polyhydric phenol, and a glycidyl polyether of a dihydric phenol containing more than one epoxide group per molecule and having a weight per epoxide below 1000. Normally, when these ingredients are reacted an elevated temperature is employed, for example, a temperature sufficient to dissolve the polybasic acid anhydride in the glycidyl polyether. It is also preferred in most instances to employ a basic catalyst, such as an alkali metal or alkaline earth metal hydroxide or an amine. The invention, of course, is not limited to the use of a catalyst, but if a catalyst is not employed, a higher curing temperature will be required. In carrying out the reaction, the mixture of polybasic acid anhydride, a polyhydric phenol and a glycidyl polyether of a dihydric phenol are heated together until a clear melt is obtained. The basic catalyst is then added, in an amount of from 0.01 to 5 percent by weight based on the composition, and the mixture is cured, producing resins having a wide range of usefulness, for example, in the potting and casting fields and in the field of adhesives. The resin compositions prepared in accordance with an aspect of this invention therefore include curable mixtures of glycidyl polyethers of dihydric phenols along with polybasic acid anhydrides and polyhydric phenols. By polyhydric phenols is meant mono- or poly-nuclear phenols having at least two phenolic hydroxyl substituents and free of other reactive groups capable of reacting with an anhydride, epoxide, hydroxyl, or carboxyl group.

A particular advantage of this invention is that high molecular weight epoxides can be used to prepare resins having improved properties. For example, when high molecular weight glycidyl polyethers of the dihydric phenols are employed in accordance with this invention, more flexible resins are obtained.

The use of a polyhydric phenol in the modification of anhydride-epoxide compositions is considered unlike the use of polyhydric alcohol. Acid anhydride, if pure, will not react with an epoxy group but preferentially will react with an alcoholic hydroxyl group. However, when a phenol, rather than an alcohol, is used in combination with the mixture of polybasic acid anhydride and glycidyl polyether, a reaction takes place between epoxide groups and phenolic hydroxyl groups bringing about a different type of cross-linking. The reaction between phenolic hydroxyl groups and epoxide groups results in the formation of alcoholic hydroxyls, which in turn are reactive with polybasic acid anhydrides. This reaction of polybasic acid anhydride and alcoholic hydroxyls results in the formation of free carboxyl radicals which will react with additional epoxide groups, the entire mechanism resulting in the formation of cross-linked compounds. These cross-linked compounds are well cured resins when reactants are combined in ratios in accordance with this invention.

It has been noted that when two mols of anhydride are caused to react with one mol of an epoxide, a resin results having a limited use because of its brittleness. In the case of glycidyl polyethers, it is perhaps better to use epoxide equivalents. The epoxide equivalent represents the weight of the product per epoxide group. The epoxide equivalent of epoxy compounds is determined by titrating a one gram sample with an excess of pyridine containing pyridine hydrochloride (made by adding 16 cc. of concentrated hydrochloric acid per liter of pyridine) at the boiling point for 20 minutes and back titrating the excess of pyridine hydrochloride with 0.1 N sodium hydroxide using phenolphthalein as indicator, and considering one HCl as equivalent to one epoxide group. Throughout this description the molecular weight of the glycidyl polyether is assumed to be two times the weight per epoxide. Molecular weight determination can, however, be made by a standard boiling point elevation method. In some cases, the molecular weight values correspond to the theoretical values for a straight chain polymer. In other cases, however, a higher molecular weight value is obtained, seemingly indicating a more complex structure.

The quantities of polybasic acid anhydride, polyhydric phenol and glycidyl polyether of a dihydric phenol employed in the practice of this invention are best expressed in ratios of glycidyl polyether to diphenol to anhydride, wherein the glycidyl polyether is expressed in epoxide equivalents, wherein the anhydride is expressed in anhydride equivalents and wherein the polyhydric phenol is expressed in phenolic hydroxyl equivalents. It has been found, for example, that the three reactants desirably can be used in a ratio of two epoxide equivalents of glycidyl polyether to from 0.2 to 1.5 phenolic hydroxyl equivalents of polyhydric phenol to from 0.5 to 2 equivalents of the polybasic acid anhydride. An anhydride equivalent represents the weight of the acid anhydride, generally in grams, per anhydride group. Thus by two anhydride equivalents is intended two times the weight per anhydride. By phenolic hydroxyl equivalents of polyhydric phenol is intended the weight in grams per phenolic OH group. Resins can, of course, be prepared using slightly more than the quantities set forth. For example, in the case of some diphenols 1.6 or more phenolic equivalents of polyhydric phenol can be used in the preceding ratio but, in general, the resulting resinous compositions are less desirable. Obviously, excellent cures are obtainable using lower quantities of polyhydric phenol. In the case of diphenols a simplified expression for maximum amounts of glycidyl polyether to diphenol to polybasic acid anhydride resulting in desirable resins is a ratio of not more than 2 to $x$ to $(2-2x)$, where $x$ is a figure greater than zero and less than 0.75 and wherein the glycidyl polyether and anhydride are expressed in epoxide equivalents and the diphenol is expressed in mols. For example, when it is desired to use 0.5 mol diphenol for two epoxide equivalents of glycidyl polyether, $x$ in the expression will be 0.5 and the amount of anhydride per two epoxide equivalents will be $2-(2\times0.5)$, which is $2-1$, or one mol of anhydride. Assuming that one mol of a glycidyl polyether is equal to two times the weight per epoxide (two epoxide equivalents), the ratio in mols of glycidyl polyether to diphenol to polybasic acid anhydride would be 1 to 0.5 to 1.

The general procedure for preparing resin compositions in accordance with this invention is to mix the glycidyl polyether of a dihydric phenol, the polybasic acid anhydride, and the diphenol and to heat the mixture with stirring until a homogeneous mixture is obtained. It is understood, however, that while the polyhydric phenol can be incorporated as such the polyhydric phenol can be partially reacted with epoxide. For instance, the polyhydric phenol can be added partially as the reaction product of phenol plus epoxide and partially as polyhydric phenol per se.

To obtain a homogeneous mixture the amount of heat required is sufficient to dissolve the phthalic or other polybasic acid anhydride in the glycidyl polyether. This temperature generally is about 80° C. and not above 200° C. and is adjusted to afford a means for controlling the reaction rate. In any case, the temperature should not be sufficiently high to cause premature gelation. The catalyst is then added and the homogeneous mixture, if desired, is poured into a container of desired shape and heated to obtain the cure. Excellent cures are obtained by the use of amine catalysts.

As indicated, this invention is applicable to glycidyl polyethers of dihydric phenols containing more than one epoxide group per molecule and having a weight per epoxide below 1000. Such glycidyl polyethers are generally produced by the reaction of epichlorhydrin or glycerol dichlorhydrin with dihydric phenols generally in the presence of a condensing agent, for example, caustic alkali.

The products resulting from the reaction of a dihydric phenol with epichlorhydrin of glycerol dichlorhydrin are monomeric or straight chain polymeric products characterized by the presence of at least one terminal expoxide group. Monomeric polyglycidyl polyethers include the glycidyl polyethers of dihydric phenols obtained by reacting in an alkaline medium a dihydric phenol with an excess, e.g., 4 to 8 mol excess, of an epihalohydrin. Thus a polyether which is substantially 2,2-bis(2,3-epoxypropoxyphenyl)-propane is obtained by reacting bisphenol, 2,2-bis-(4-hydroxyphenyl)propane with an excess of epichlorhydrin. Other polyhydric phenols that can be used for this purpose include resorcinol, catechol, hydroquinone, methyl resorcinol, or polynuclear phenols, such as 2,2-bis(4-hydroxyphenyl)butane, 4,4'-dihydroxybenzophenone, bis(4-hydroxyphenyl)ethane, and 1,5-dihydroxy-naphthalene. The epihalohydrins can be further exemplified by 3-chloro-1,2-epoxybutane, 3-bromo-1,2-epoxyhexane, 3-chloro-1,2-epoxyoctane, and the like.

Another class of straight chain polymeric glycidyl polyethers is produced by the reaction of a dihydric phenol such as bisphenol with epichlorhydrin or glycerol dichlorhydrin using different proportions of reactants. In the production of this class of epoxide resins the proportions of bisphenol and epichlorhydrin or glycerol dichlorhydrin vary slightly from about one mol bisphenol to 1.2 mols epichlorhydrin or glycerol dichlorhydrin to about one mol bisphenol to 1.5 mols epichlorhydrin or glycerol dichlorhydrin as set forth in U.S. Patent 2,615,007. In addition, sufficient caustic alkali is employed to combine with the chlorine atom of the epichlorhydrin or glycerol dichlorhydrin.

Still another group of polymeric glycidyl polyethers is produced by the reaction of a dihydric phenol such as bisphenol with epichlorhydrin in the proportions of about 2 mols of epichlorhydrin to about 1 mol of bisphenol and with the use of caustic alkali in amounts sufficient to combine with the chlorine of the epichlorhydrin. Such glycidyl polyethers are described in U.S. Patent 2,582,985. Examples of these polymeric glycidyl polyethers include polyepoxypolyhydroxy polyethers obtained by reacting (preferably in the presence of an alkali metal hydroxide) epichlorhydrin or glycerol dichlorhydrin, with resorcinol, hydroquinone, catechol, phloroglucinol, etc., or polynuclear phenols, such as bisphenol (p,p'-dihydroxydiphenyl dimethyl methane), p,p'-dihydroxybenzophenone, p,p'-dihydroxydiphenyl, p,p'-dihydroxydibenzyl, hematoxylin, the dihydric anthracenes, the dihydric naphthalenes, etc. Bisphenol is particularly advantageous for use in making these glycidyl polyethers.

Another group of polymeric glycidyl polyethers which can be used in accordance with this invention results from the reaction, generally in alkaline or acid medium, of a dihydric phenol with a glycidyl polyether. Examples of these are polyepoxypolyhydroxy polyethers obtained by reacting, preferably in an alkaline or an acid medium, a polyhydric phenol with a polyepoxide such as the reaction product of bisphenol and bis(2,3-epoxy-2-methyl propyl)-ether, the reaction product of resorcinol and bis(2,3-epoxypropyl)ether, and the reaction product of catechol, etc. The process for preparing polyepoxypolyhydroxy polyethers of this group is disclosed in U.S. Patent 2,615,008.

The polycarboxylic acid anhydrides useful in preparing the resin compositions of this invention contain one or more anhydride groups. Polybasic acid anhydrides applicable to this invention include both aliphatic and aromatic dicarboxylic acid anhydrides, either saturated or unsaturated, for example, succinic, adipic, maleic, tricarballyic, phthalic and pyromellitic acid anhydrides. Endo-cis-bicyclo-(2,2,1)-5-heptene-2,3-dicarboxylic anhydride (sold under the trademark "Nadic" or "Carbic" anhydride), and 1,4,5,6,7,7-hexachlorobicyclo-(2,2,1)-5-heptene-2,3-dicarboxylic anhydride (sold under the trademark "Chlorendic" anhydride) are also desirable. Preferred polybasic acid anhydrides are the anhydrides of dicarboxylic acids, preferably phthalic acid anhydride. The acid anhydrides, which are produced by diene syntheses can also be used, for instance, the acid anhydrides which are derived from eleostearic acid-glyceride and maleic acid anhydride, also those of maleic acid anhydride plus terpinene or limonene or other unsaturated hydrocarbons of the terpene series. Other polybasic acid anhydrides within the contemplation of this invention are anhydrides of glutaric, sebacic, isosuccinic, tetrahydrophthalic, naphthalene-dicarboxylic, diglycolic, hemimellitic, and trimellitic acids.

It has been pointed out that while the invention is not limited thereto, the use of a catalyst is preferred. Generally speaking, any of the known catalysts which are activators for epoxide-carboxyl or phenolic hydroxyl epoxide reactions can be used to increase the rate of cure of the compositions, for example, organic bases, tertiary amines, and quaternary ammonium hydroxides. Basic catalysts are generally used for this purpose, for example, alkali metal or alkaline earth metal hydroxides and organic bases, such as sodium hydroxide, potassium hydroxide, calcium hydroxide, barium hydroxide, dimethylaminomethyl phenol, tributyl amine, etc. These basic catalysts are employed in catalytic quantities, say of 0.01 to 5 percent by weight based on the composition.

Methods of preparing the modified epoxide resins of this invention will be readily apparent from the following examples. The examples are intended to be illustrative only, since in the light of these examples, variations and modifications will become obvious. In the examples, the glycidyl polyethers of polyhydric phenols are expressed in mols. For the purpose of the examples, one mol was assumed to be two times the weight per epoxide.

EXAMPLE 1

Part A

About 744 parts (3.26 mols) of 2,2-bis(4-hydroxyphenyl)propane and 223 parts (5.57 mols) of sodium hydroxide (20 percent excess) were combined in 1900 parts water and heated to about 29° C. whereupon 423 parts (4.5 mols) of epichlorohydrin were added rapidly. The temperature was increased and remained at about 93° C. for 90 minutes. The mixture was separated into a two phase system and the aqueous layer drawn off. The resinous layer that remained was washed with hot water and then drained and dried at a temperature of 140° C. The Durrans' Mercury Method melting point of the resulting glycidyl polyether was 80° C. and the weight per epoxide was about 586.

Part B 31.7 grams (0.027 mol) of the glycidyl polyether of Part A of this example, 4 grams (0.027 mol) of phthalic acid anhydride, and 3.08 grams (0.0135 mol) of bisphenol were combined and heated with stirring until a clear melt was obtained and 0.15 gram of dimethylaminomethyl phenol catalyst was then added. A portion of the melt, about 25 grams, was poured into an aluminum cup. In a closed container, whereby no anhydride would be lost through volatilization, the 25 gram portion was cured at a temperature of about 180° C. by heating it at this temperature for about one hour. The resulting resin was hard but flexible and it was unaffected by further heating.

EXAMPLE 2

Part A

In a flask equipped with a stirrer, condenser, and thermometer were placed 330 grams (3 mols) of resorcinol, and 2775 grams (30 mols) of epichlorhydrin in 27 grams of water. To this mixture 250 grams of sodium hydroxide flakes were added slowly in two additions. First 165 grams were added and the flask was slowly heated. When the temperature reached 105° C., heat was withdrawn and the mixture was cooled in a water bath. When the temperature of the mixture decreased to 100° C., an additional 85 grams of sodium hydroxide were added, the mixture being continuously cooled because of the exothermic reaction. After the exotherm subsided, the material was distilled to remove the water. The flask was then cooled, 1000 cc. of benzene added and the glycidyl polyether filtered to remove the sodium chloride. The excess epichlorhydrin and other volatile matter were removed under vacuum. A pale amber, viscous liquid having a weight per epoxide of 143 was obtained.

Part B 5.9 grams (0.0243 mol) of the glycidyl polyether of Part A of this example, 1.42 grams (0.0145 mol) of maleic acid anhydride, and 3.13 grams (0.015 mol) of bisphenol were added to a vessel adapted with a stirring rod and the vessel was slowly heated until the reactants formed a clear melt. Dimethylaminomethyl phenol, 0.05 gram, was then added as a catalyst. In order to cure the melt, 25 grams were transferred to a shallow aluminum cup which was placed in a container so that none of the anhydride would be lost through volatilization. By heating the resinous melt for one hour at a temperature of 180° C., a cured product was obtained. The resulting product was a well cured, tough, flexible resin.

EXAMPLE 3

Part A

About one mol of bisphenol was dissolved in ten mols of epichlorhydrin and one to two percent water was added to the resulting mixture. The mixture was then brought to 80° C. and 2 mols of solid sodium hydroxide were added in small portions over a period of about one hour. During the addition, the temperature of the mixture was held at about 90° C. to 110° C. After the sodium hydroxide had been added, the water formed in the reaction and most of the epichlorhydrin was distilled off.

| Diphenol | | | Glycidyl Polyether | | Anhydride | | Resin |
|---|---|---|---|---|---|---|---|
| grams | mols | compound | grams | mols | grams | mols | properties |
| 3.08 | .0135 | bisphenol | 10 | .027 | 4 | .027 | well cured, hard, flexible resin. |
| 3.86 | .017 | ___do___ | 10 | .027 | 3 | .020 | well cured, tough, flexible resin. |
| 4.64 | .020 | ___do___ | 10 | .027 | 2 | .0135 | well cured but brittle. |
| 2.51 | .0135 | p,p'-dihydroxy diphenyl | 10 | .027 | 4 | .027 | well cured, tough, flexible resin. |
| 3.13 | .017 | ___do___ | 10 | .027 | 3 | .020 | hard but flexible, well cured. |
| 3.76 | .020 | ___do___ | 10 | .027 | 2 | .0135 | Do. |
| 4.35 | .023 | ___do___ | 10 | .027 | 1 | .007 | resin not as well cured. |
| 3.37 | .0135 | p,p'-dihydroxydiphenyl sulfone. | 10 | .027 | 4 | .027 | hard and flexible but slightly brittle. |
| 4.21 | .017 | ___do___ | 10 | .027 | 3 | .020 | Do. |
| 5.05 | .020 | ___do___ | 10 | .027 | 2 | .0135 | Do. |
| 5.90 | .023 | ___do___ | 10 | .027 | 1 | .007 | Do. |
| 1.50 | .0135 | resorcinol | 10 | .027 | 4 | .027 | tough, hard, well cured, flexible resin. |
| 1.87 | .017 | ___do___ | 10 | .027 | 3 | .020 | Do. |
| 2.25 | .020 | ___do___ | 10 | .027 | 2 | .0135 | resin not too well cured. |
| 2.62 | .024 | ___do___ | 10 | .027 | 1 | .007 | Do. |
| 1.50 | .0135 | hydroquinone | 10 | .027 | 4 | .027 | hard, tough, well cured, flexible resin. |
| 1.87 | .017 | ___do___ | 10 | .027 | 3 | .020 | well cured, hard, tough, flexible resins. |
| 2.25 | .020 | ___do___ | 10 | .027 | 2 | .0135 | resin not too well cured. |
| 2.62 | .024 | ___do___ | 10 | .027 | 1 | .007 | uncured. |

The residue was combined with an approximately equal amount of benzene and the glycidyl polyether filtered to remove the salt. The benzene was then removed to yield a viscous liquid having a weight per epoxide of 185.

*Part B*

Ten grams (0.027 mol) of the glycidyl polyether of Part A of this example, 6.02 grams (0.016 mol) of Chlorendic [1] acid anhydride and 2.08 grams (0.019 mol) of resorcinol were heated together, in a vessel provided with stirring, until a clear melt was obtained. Dimethylaminomethyl phenol, 0.10 gram, was then added as a catalyst. In order to cure the resinous melt about 25 grams of this clear melt were transferred to a shallow aluminum cup which was placed in a closed container. The resin was cured in the container by heating the product for one hour at a temperature of 180° C. A well cured, flexible resin was thus obtained.

EXAMPLE 4

*Part A*

A resinous material was prepared according to Part A of Example 3.

*Part B*

Ten grams (0.027 mol) of the glycidyl polyether of Part A, 2.95 grams (0.014 mol) of sebacic acid anhydride and 2.08 grams (0.019 mol) of hydroquinone were combined in a vessel equipped with stirring means, and the vessel was heated until the combination of reactants formed a clear melt. Dimethylaminomethyl phenol, 0.06 gram, was then added as a catalyst. A 25 gram portion of the melt thus formed was transferred to an aluminum container about 2 inches in diameter. Curing of the resinous melt was accomplished by heating the aluminum container in an enclosure whereby no anhydride would be lost through volatilization to a temperature of 180° C. for one hour. The resulting resin was well cured, hard, tough and flexible.

EXAMPLE 5

A variety of diphenols were reacted with the glycidyl polyether of Part A of Example 3, and phthalic anhydride in varying proportions of reactants. In each case the reactants were mixed thoroughly, melted and put into a shallow aluminum container in accordance with the above examples. After the melt was obtained approximately 1 percent dimethylaminomethyl phenol was added as a

[1] Trademark.

catalyst. The resinous melts were cured by heating them for 1 hour at 180° C. The reactants and general characteristics of the products are here tabulated:

EXAMPLE 6

Using a glycidyl polyether prepared in accordance with Part A of Example 3 a hard, tough, flexible resin was prepared using phloroglucinol. 10 grams (0.027 mol) of the glycidyl polyether of Example 3, Part A, 4 grams (0.027 mol) of phthalic acid anhydride and 1.13 grams (0.009 mol) of phloroglucinol were combined and heated. When a clear melt was obtained 0.10 gram of dimethylaminomethyl phenol was added and the resinuous melt was cured for about one hour at a temperature of 180° C. in a shallow aluminum cup placed in a closed container.

EXAMPLE 7

A well cured, hard, tough, flexible resin was obtained using a mixture of mono- and di-anhydride in combination with resorcinol, and the glycidyl polyether prepared in accordance with Part A of Example 3. Ten grams (0.027 mol) of the glycidyl ether of Part A of Example 3, 1.5 grams (0.0135 mol) of resorcinol, 2.06 grams (0.014 mol) phthalic anhydride and 1.3 grams (0.006 mol) of pyromellitic dianhydride were heated until a clear melt resulted. After the melt was obtained, 0.1 gram of dimethylaminomethyl phenol was added as a catalyst. In order to produce the cured resin the melt was heated for about one hour at a temperature of 180° C. in a shallow cup in a closed container.

EXAMPLE 8

Following the procedure of Example 3 and using the glycidyl polyether of Part A of Example 3 a resinous composition was prepared using a commercial diphenol which is essentially a dihydric phenol comprising a mixture of poly (hydroxy phenyl) pentadecanes having an average molecular weight of 410. The major constituent in this mixture has the following structure:

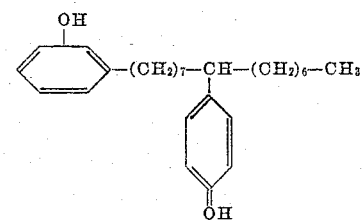

In preparing the resinous composition, 10 grams (0.02 mol) of the glycidyl polyether of Part A of Example 3, 4.4 grams (0.030 mol) of phthalic anhydride, and 5 grams (0.012 mol) of the phenol mixture described were heated together in a vessel provided with stirring until a clear melt was obtained. After the melt was obtained 0.10 gram of dimethylaminomethyl phenol was added as a catalyst. The resin was heated at a temperature of 180° C. as in the above examples and a hard, tough but flexible, well cured resin was obtained.

The above examples illustrate that excellent, well cured resins can be obtained by the modification of a glycidyl polyether of a dihydric phenol in admixture with phthalic anhydride by the addition of not more than about 1.5 phenolic hydroxyl equivalents of a polyhydric phenol for two epoxide equivalents. The examples also show that even more desirable resins are obtained using lower quantities of the polyhydric phenol. Particularly desirable are diphenols. The resins of this invention, modified by the use of a diphenol, have a much wider range of properties than the same glycidyl polyether cured with phthalic anhydride alone. There are also differences in flexibility, stress-strain properties, impact strength, heat distortion and the like.

In addition to advantages in properties, the incorporation of a polyhydric phenol into anhydride cured epoxide resins has a distinct economic advantage over the unmodified resins since polyhydric phenols are less expensive than glycidyl polyethers which they replace, yet the resulting resin has improved properties when compared with the unmodified resin, that is, the resin cured with the anhydride alone. Hence, the final product is not only considerably less expensive but is better suited for many applications.

The new resins which are products of the process of this invention are especially advantageous for use in the fields of adhesives, molding, paints, varnishes, potting, and the like, principally for heat hardening plastics, heat hardening varnishes, enamels, and other coatings, electrical insulation, and castings.

Other uses and embodiments of the invention will occur to those skilled in the art. For example, the resins of this invention can have certain additional materials incorporated with them to alter or improve some property, or to make them more easily molded. Among the materials which can be added are fillers such as finely divided wood flour, cotton flock, mica, and asbestos; coloring materials such as pigments; thinners which will enable the formation of thin coatings for protection of such materials as metal; plasticizers to aid in adapting the resins to different uses or to impart to them somewhat different properties; and small amounts of other materials which may hasten curing. Such embodiments may be made without departing from the spirit and scope of this invention.

What is claimed is:

1. A process for preparing a resin which comprises at a temperature of about 80° C. to about 200° C. mixing and simultaneously contacting and reacting a glycidyl polyether of a dihydric phenol containing more than one epoxide group per molecule and having a weight per epoxide below 1000, a polyhydric phenol having at least two phenolic hydroxyls as its sole reactive groups, and a polycarboxylic acid anhydride in a ratio of two epoxide equivalents of glycidyl polyether to from 0.2 to 1.5 phenolic hydroxyl equivalents of polyhydric phenol to from 0.5 to 2 equivalents of the polybasic acid anhydride to produce an insoluble, infusible resinous composition, considering an anhydride equivalent as the weight of acid anhydride in grams per anhydride group, a phenolic hydroxyl equivalent as the weight of phenol in grams per phenolic hydroxyl group and an epoxide equivalent as the weight in grams of the glycidyl polyether per epoxide group.

2. The process of claim 1, wherein the polyhydric phenol is a difunctional diphenol and wherein the polycarboxylic acid anhydride is a dicarboxylic acid anhydride.

3. The process of claim 2, wherein the diphenol is a mononuclear diphenol and wherein the dicarboxylic acid anhydride is maleic acid anhydride.

4. The process of claim 2, wherein the diphenol is a binuclear diphenol and wherein the dicarboxylic acid anhydride is phthalic acid anhydride.

5. A cross-linked, infusible resinous reaction product resulting from the process of claim 1.

6. A process for preparing a resin which comprises mixing and simultaneously contacting and reacting a glycidyl polyether of a dihydric phenol containing more than one epoxide group per molecule and having a weight per epoxide below 1000, a dihydric phenol, and a dicarboxylic acid anhydride in the presence of a catalyst selected from the group consisting of inorganic bases, tertiary amines and quaternary ammonium hydroxides, and heating the mixture of reactants to at least the melting point of the highest melting reactant, the ratio of glycidyl polyether to diphenol to dicarboxylic acid anhydride not exceeding 2 to $x$ to $(2-2x)$, where $x$ is a figure greater than zero and less than 0.75 and wherein the glycidyl polyether is expressed in epoxide equivalents and the diphenol and anhydride are expressed in mols, considering an epoxide equivalent as the weight in grams of the glycidyl polyether per epoxide group.

7. The process of claim 6 wherein the glycidyl polyether is substantially the diglycidyl ether of a dihydric phenol having a weight per epoxide of 140 to 200, wherein the dicarboxylic acid anhydride is phthalic acid anhydride and wherein the diphenol is p,p'-dihydroxydiphenyl.

8. The process of claim 6 wherein the ratio of glycidyl polyether to diphenol to phthalic acid anhydride is 2:0.5:1, the glycidyl polyether being expressed in epoxide equivalents and the diphenol and dibasic acid anhydride in mols.

9. The process of claim 7 wherein the glycidyl polyether is a diglycidyl ether of bis-(4-hydroxyphenyl)-2,2-propane having a weight per epoxide of 180 to 250, wherein the diphenol is bis-(4-hydroxyphenyl)-2,2-propane and wherein the dicarboxylic acid anhydride is phthalic acid anhydride.

10. A cross-linked, infusible, resinous reaction product resulting from the process of claim 6.

11. A cross-linked, infusible, resinous reaction product resulting from the process of claim 7.

12. A composition comprising an intimate mixture of a glycidyl polyether of a polyhydric phenol, containing more than one epoxide group per molecule and having a weight per epoxide below 1000, a polybasic acid anhydride, and a dihydric phenol, the ratio of glycidyl polyether to dihydric phenol to polybasic acid anhydride not exceeding 2 to $x$ to $(2-2x)$, where $x$ is a figure greater than zero and less than 0.75 and wherein the glycidyl polyether is expressed in epoxide equivalents and the dihydric phenol and anhydride are expressed in mols, considering an epoxide equivalent as the weight in grams of the glycidyl polyether per epoxide group.

References Cited in the file of this patent
UNITED STATES PATENTS

| 2,324,483 | Castan | July 20, 1943 |
| 2,512,997 | Bixler | June 27, 1950 |
| 2,615,008 | Greenlee | Oct. 21, 1952 |
| 2,651,589 | Shokal et al. | Sept. 8, 1953 |
| 2,668,807 | Greenlee | Feb. 9, 1954 |
| 2,728,744 | May et al. | Dec. 27, 1955 |

FOREIGN PATENTS

| 630,647 | Great Britain | Oct. 18, 1949 |

OTHER REFERENCES

Ind. and Eng. Chem., vol. 48, No. 1, pp. 86–93 (January 1956).